United States Patent [19]

Brunskill et al.

[11] 3,790,783
[45] Feb. 5, 1974

[54] RADIATION DOSEMETERS OF THE THERMOLUMINESCENT TYPE

[75] Inventors: Robert Thompson Brunskill, Holmrock; Walter Alfred Langmead, Wantage, both of England

[73] Assignee: United Kingdom Atomic Energy Authority, London, England

[22] Filed: Sept. 20, 1971

[21] Appl. No.: 181,808

[30] Foreign Application Priority Data
Nov. 6, 1970    Great Britain .................... 52,980/70

[52] U.S. Cl. ............................................. 250/362
[51] Int. Cl. ............................................. G01t 1/11

[58] Field of Search ............ 250/71 R, 83 R, 83 CD

[56] References Cited
UNITED STATES PATENTS
3,115,578    12/1963    Schulman .......................... 250/71 R
3,283,150    11/1966    Schayes ............................ 250/71 R
3,573,221    3/1971     Brunskill ...................... 250/83 R X Primary Examiner—Archie R. Borchelt
Attorney, Agent, or Firm—Larson, Taylor & Hinds

[57] ABSTRACT

A radiation dosemeter comprising thermoluminescent powder mounted on a base of graphite or other material which can be heated by radiofrequency.

2 Claims, 1 Drawing Figure

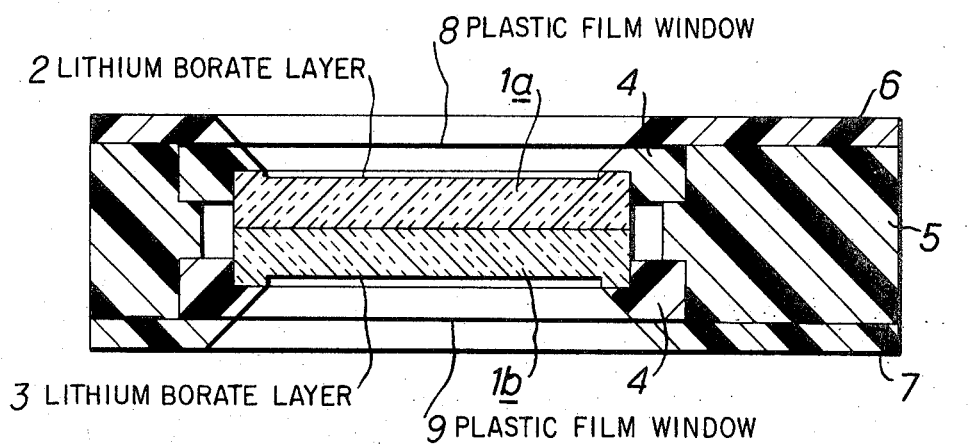

RADIATION DOSEMETERS OF THE THERMOLUMINESCENT TYPE

BACKGROUND OF THE INVENTION

This invention relates to dosemeters.

Certain crystalline substances known as thermoluminescent materials have the capacity to absorb energy when exposed to ionising radiation, to store the energy until heated and then to emit the energy as light or luminescence, the magnitude of the emission providing a measure of the radiation dose received by the substance.

SUMMARY OF THE INVENTION

According to the present invention a radiation dosemeter comprises thermoluminescent powder mounted on a base of a material which can be heated by radiofrequency heating. Graphite is considered the most suitable base material because of its closeness to tissue equivalence - a property depending at least in part on electron density and atomic number. The more closely the base material approaches tissue equivalence the more accurate the dosemeter incorporating that material will be. Apart from graphite other possible base materials are certain aluminum base alloys.

In addition to considering tissue equivalence the base material must of course withstand the temperature required to determine the radiation dose received by the thermoluminescent powder mounted on the base. Consequently synthetic plastic materials rendered conducting by the inclusion of graphite are unlikely to be suitable.

A preferred thermoluminescent powder is lithium borate doped with manganese which has found use in radiation dosimetry because of its good tissue equivalence and because it can be re-used immediately after heating to determine its radiation dose. Other thermoluminescent powders such as lithium fluoride may also be used. By mounting the powder on a base in accordance with the invention it may be heated by subjecting the base to radiofrequency heating.

If the base is disposed in a holder of electrically insulating material which is not affected by radiofrequency heating of the base it is not necessary to remove the base from the holder before heating. Provision may be made also for circulating nitrogen through any air space within the holder during heating and read-out to improve the accuracy of the dose measurement.

The thermoluminescent powder may be mounted on both faces of a lamellar base. Alternatively two lamellar bases may be employed back to back with the termoluminescent powder mounted on the outer faces. In either case a dosemeter may be made up in which thermoluminescent powder on one side of the dosemeter is exposed so that it is affected by both beta and gamma radiation and on the other side is shielded by the base or bases so that beta radiation is cut off and the powder is accordingly affected only by gamma radiation. Hence beta and gamma radiation doses may be measured concurrently if detectors are provided opposite both sides of the dosemeter during heating in a radiofrequency field. A suitable read-out apparatus comprises two separated single coils or wire spaced so that the dosemeter can be positioned between them. The coils of wire are connected to a radiofrequency electricity supply and the field set up between the coils heats the base material lying between them. Beyond the coils or wire, opposite the mounted thermoluminescent powder on each side of the dosemeter, is a photomultiplier tube whose axis lies at right angles to the plane of the coils. The photomultiplier tubes measure the light emitted by the thermoluminescent powder on each side of the dosemeter.

The thermoluminescent powder may be held on a graphite base by silicone resin which must be nonluminous and able to withstand transient temperatures of up to 350°C. The resin known as R.281 and manufactured by ICI Ltd. has been found satisfactory for use with lithium borate. The holder may be of synthetic plastic material. Conveniently polytetrafluorethylene which is closely tissue equivalent and able to withstand the temperature reached by the graphite base during read-out may surround the base. The outer container may be of Tufnol with radiation and light transparent windows of fluorinated ethylene propylene film, for example, to ensure no thermoluminescent powder is lost in use.

DESCRIPTION OF THE DRAWINGS

By way of example only a radiation dosemeter in accordance with the invention will now be described with reference to the accompanying drawing which is in medial section.

DESCRIPTION OF THE PREFERRED EMBODIMENT

In the drawing is shown a dosemeter comprising two graphite discs 1a, 1b with thermoluminescent lithium borate mounted on their outer faces 2, 3. The discs 1a, 1b, are inserted within surrounds 4 of polytetrafluorethylene which are set within a plastic body piece 5 forming with side pieces 6, 7 a holder for the dosemeter. Windows 8, 9 of fluorinated ethylene propylene film are clamped between the side pieces 6, 7 and surrounds 4.

The dosemeter is intended to be worn on a worker's clothing with one side exposed (beneath its window) and the other side shielded by backing on to the clothing. The exposed side will record both beta and gamma radiation the shielded side gamma radiation only. After each read-out the dosemeter is available for re-use immediately and may be re-used in this way repeatedly.

The discs 1a, 1b may be replaced by a single disc having powder mounted on both faces.

We claim:

1. A method of measuring radiation dose comprising the steps of mounting thermoluminescent powder on a graphite base and disposing the base in a holder of electrically insulating material unaffected by radiofrequency heating to form a dosemeter, exposing the dosemeter to radiation and subsequently heating the graphite base by radiofrequency heating and measuring the light emitted by the thermoluminescent powder mounted on the base for determining the dose of radiation to which the powder was exposed.

2. A method of measuring radiation dose as claimed in claim 1 wherein the thermoluminescent powder is mounted on both faces of a lamellar graphite base, the dosemeter is exposed to radiation in a manner such that one face is self-shielded from beta radiation and the light emitted by the thermoluminescent powder is measured from both faces of the base simultaneously but separately.

* * * * *